(12) United States Patent
Pall et al.

(10) Patent No.: US 10,447,749 B2
(45) Date of Patent: *Oct. 15, 2019

(54) METHOD AND SYSTEM FOR DELIVERING DATA TO A BATCH CONSUMER AND A STREAMING CONSUMER

(71) Applicant: InMobi PTE LTD., Singapore (SG)

(72) Inventors: Inderbir Singh Pall, Bangalore (IN); Sharad Agarwal, Bangalore (IN)

(73) Assignee: InMobi PTE LTD., Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,834

(22) Filed: Jan. 2, 2018

(65) Prior Publication Data

US 2018/0124145 A1 May 3, 2018

Related U.S. Application Data

(63) Continuation of application No. 14/728,248, filed on Jun. 2, 2015, now Pat. No. 9,860,292.

(51) Int. Cl.
*H04L 29/06* (2006.01)
*H04L 12/24* (2006.01)
*G06F 16/957* (2019.01)
*H04L 29/08* (2006.01)

(52) U.S. Cl.
CPC .......... *H04L 65/60* (2013.01); *G06F 16/957* (2019.01); *H04L 41/5003* (2013.01); *H04L 67/2842* (2013.01)

(58) Field of Classification Search
CPC ...... H04L 65/60; H04L 41/5003; H04L 51/24; G06F 17/30899; G06F 17/3037
USPC .......................................................... 709/217
See application file for complete search history.

(56) References Cited

U.S. PATENT DOCUMENTS

2005/0078189 A1* 4/2005 Creamer ............ H04N 1/00214
348/207.1
2008/0059532 A1* 3/2008 Kazmi .................... G06F 21/10

OTHER PUBLICATIONS

Notice of Allowance dated Aug. 25, 2017, mailed in U.S. Appl. No. 14/728,248, pp. 1-18.
Response to Non-Final Office Action dated Jan. 27, 2017, as filed in U.S. Appl. No. 14/728,248, pp. 1-11.
Non-Final Office Action dated Jan. 27, 2017, mailed in U.S. Appl. No. 14/728,248, pp. 1-9.

* cited by examiner

*Primary Examiner* — Tu T Nguyen

(57) ABSTRACT

A method and system delivers data to a batch consumer and a streaming consumer. The method and system include retrieving data from a plurality of data centers, storing the data in a first directory, bundling the data into plurality of batches in the first directory, transferring each batch of the plurality of batches to the second directory, delivering the each batch of the plurality of batches in the second directory to the batch consumer and the streaming consumer and delivering the data in the first directory to the streaming consumer.

20 Claims, 3 Drawing Sheets

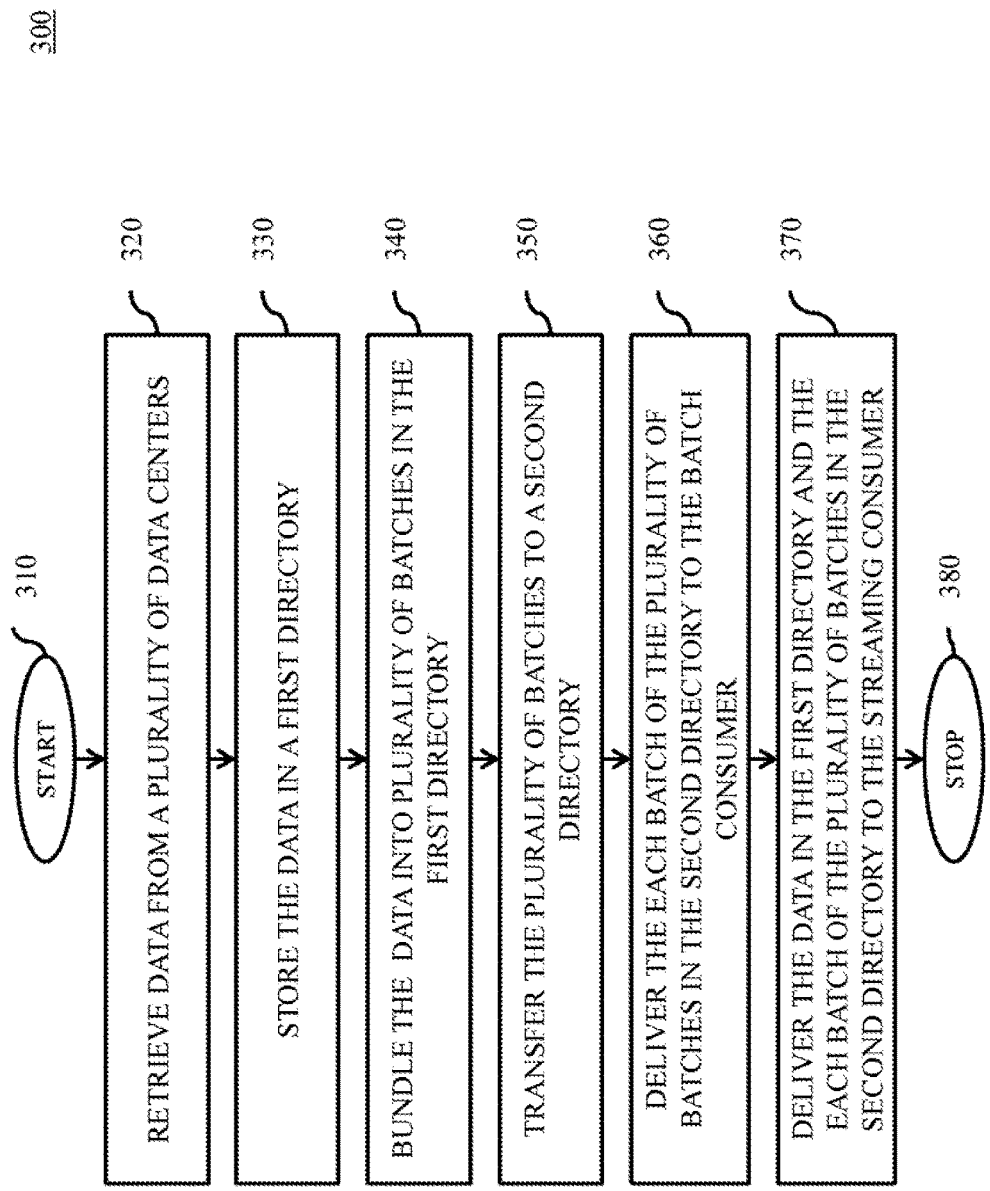

METHOD AND SYSTEM FOR DELIVERING DATA TO A BATCH CONSUMER AND A STREAMING CONSUMER

FIELD OF THE INVENTION

The present invention relates to data delivery and in particular, it relates to data distribution and analytics of large data sets.

BACKGROUND

In recent years, computing systems have seen a major change as growing volumes of data and stalling processor speeds required more and more applications to scale out to distributed systems. Today, various data sources from Internet to business operations produce large volumes of data. The management and distribution of large volumes of data, from storing to long-term archiving has become a tedious task.

The growing number of organizations led to a huge production of data, which in turn resulted in the need of speed and sophisticated data processing systems. Batch processing and streaming analysis of new real-time data sources is required to let organizations to take timely action.

In traditional distributed systems, there are multiple threads pulling data from multiple remote data centers for a given time period. For example, the data provider has a predefined Service Level Agreement (SLA) to deliver data to a consumer for every 1 minute. In such a case, for the first minute the thread T1 is pulls the data from a remote data center DC1. The thread T1 waits for the thread T2 and other such threads pulling data before proceeding to the second minute. If this flow doesn't work properly than it violates the predefined SLA, as thread T1 will move to the second minute. However, T2 is still working on the first minute. A consumer on looking at the data in the second minute might be deceived into believing that the data collected in the first minute is immutable and might not get complete snapshot of the data there. Hence, it does not provide the consumer a mechanism to have a clean abstraction and a clean implementation.

In light of the above discussion, there is a need for a method and system, which overcomes all the above stated problems.

BRIEF DESCRIPTION

The above-mentioned shortcomings, disadvantages and problems are addressed herein which will be understood by reading and understanding the following specification.

In various embodiments, the present invention provides a method for delivering data to a batch consumer and a streaming consumer. The method includes retrieving data from a plurality of data centers, storing the data in a first directory, bundling the data into plurality of batches in the first directory, transferring each batch of the plurality of batches to the second directory, delivering the each batch of the plurality of batches in the second directory to the batch consumer and the streaming consumer and delivering the data in the first directory to the streaming consumer.

In another aspect, the present invention provides a system for delivering data to a batch consumer and a streaming consumer. The system includes a data retrieval module, a storage module, a bundler, a transmitting module, and a delivery module. The data retrieval module is configured to retrieve the data from the plurality of data centers. The storage module is configured to store the data in the first directory. The bundler is configured to bundle the data into a plurality of batches in the first directory. The transmitting module is configured to transmit the each batch of the plurality of batches to the second directory. The delivery module is configured to deliver the data in the first directory to the streaming consumer and each batch of the plurality of batches to the batch consumer and the streaming consumer.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

FIG. 3 illustrates a flowchart for delivering data to the batch consumer and the streaming consumer, in accordance with various embodiments of the present invention.

DETAILED DESCRIPTION

In the following detailed description, reference is made to the accompanying drawings that form a part hereof and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
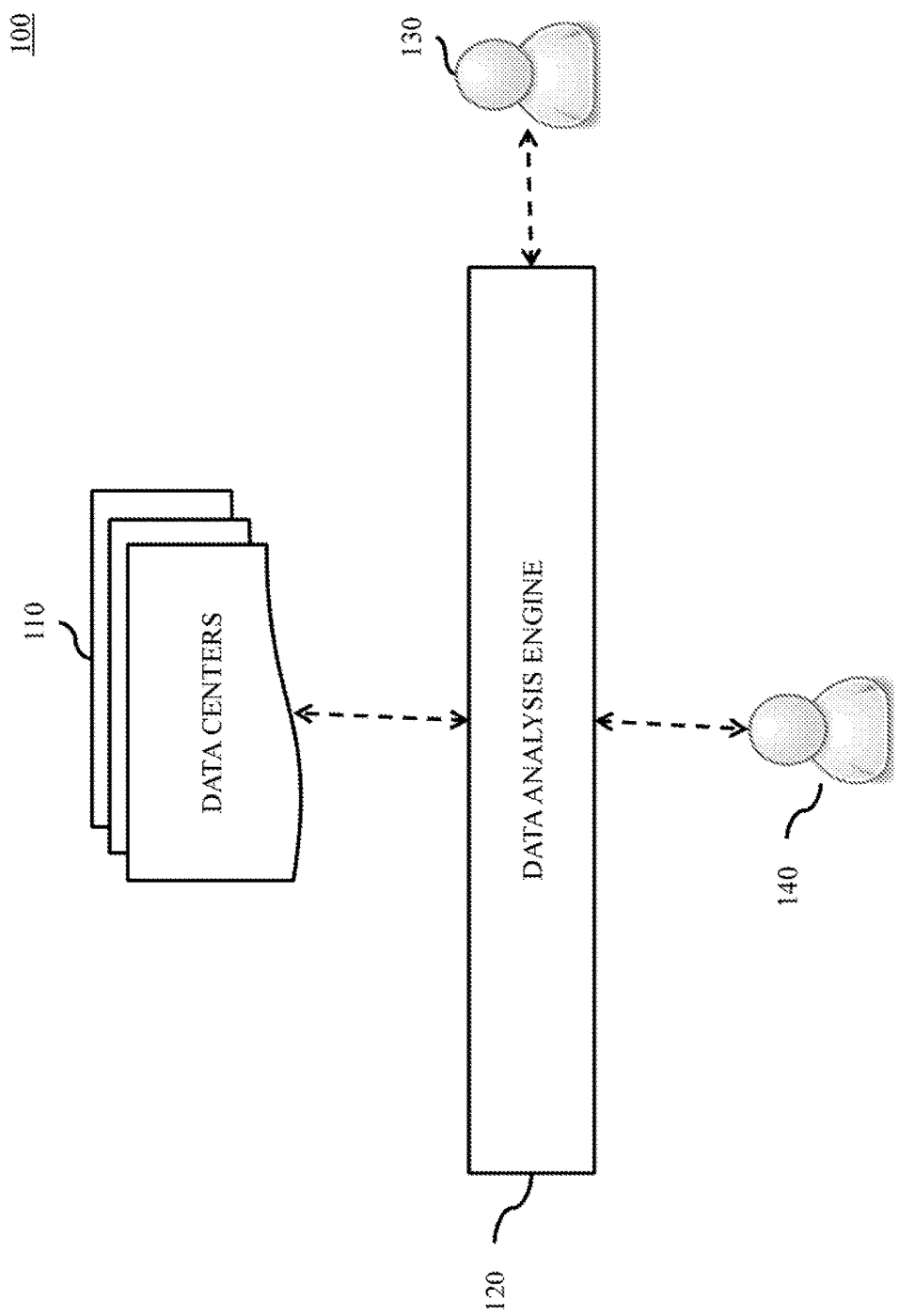
FIG. 1 illustrates a system for delivering data to a batch consumer and a streaming consumer, in accordance with various embodiments of the present invention.

FIG. 1 illustrates a system 100 for delivering data to a batch consumer 130 and a streaming consumer 140, in accordance with various embodiments of the present invention. The system 100 includes a plurality of data centers 110, a data analysis engine 120, the batch consumer 130, and the streaming consumer 140.

The plurality of data centers 110 refers to centralized repositories, either physical or virtual. The plurality of data centers 110 is used for the storage, management and dissemination of data pertaining to a particular organization.

The data analysis engine 120 refers to a processing center that collects, organizes, examines, displays and analyzes the collected data. The data analysis engine 120 processes the data retrieved from the plurality of data centers 110 in two approaches—batch analysis and streaming analysis. In batch analysis, the data analysis engine 120 collects the data retrieved from the plurality of data centers 110 over a predefined period of time. Further, the data analysis engine 120 delivers the collected data to the batch consumer 130 for analysis. In streaming analysis, the data analysis engine 120 receives a continuous stream of data from the plurality of data centers 110 and delivers the data to streaming consumer 140 for analysis.

The batch consumer 130 refers to any person, company or entity that analyzes the data collected over a period of time.

The streaming consumer 140 refers to any person, company or entity that analyzes the data received in the form of data streams. The data streams received are analyzed in a streaming or on-line fashion in real time.

Figure 2:
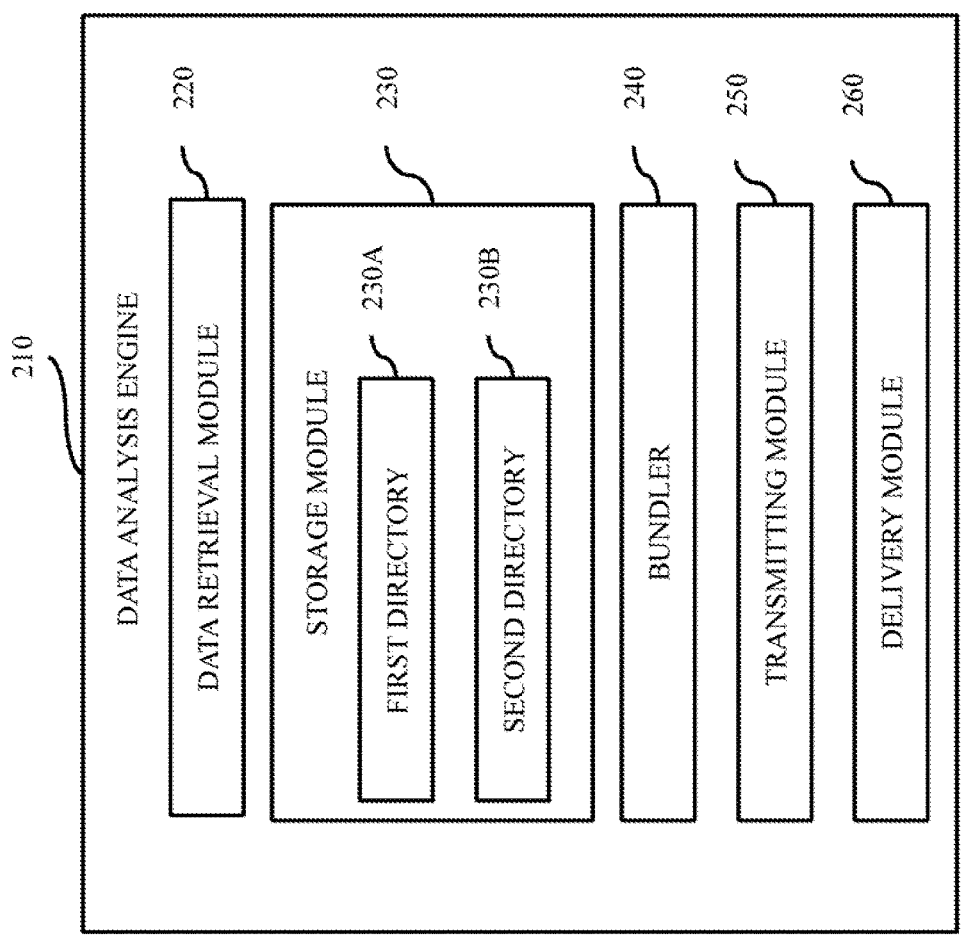
FIG. 2 illustrates a block diagram of a data analytical engine, in accordance with various embodiments of the present invention.

FIG. 2 illustrates a block diagram 200 of the data analysis engine 210, in accordance with various embodiments of the present invention. The data analysis engine 210 includes a data retrieval module 220, a storage module 230, a bundler 240, a transmitting module 250, and a delivery module 260.

The data retrieval module 220 of the data analysis engine 210 retrieves the data requested by the batch consumer 130 and the streaming consumer 140 from the plurality of data centers 110. In an embodiment, the data is continuous streamed from the plurality of data centers 110.

The storage module 230 further includes a first directory 230A and a second directory 230B. The first directory 230A refers to a memory location that stores the data retrieved from the plurality of data centers 110. The second directory 230B refers to a memory location that stores the data received from the first directory 230A.

The bundler 240 bundles the data stored in the first directory 230A into a plurality of batches. The term used herein, the plurality of batches refers to a series of data packages. The bundler 240 bundles the data in accordance with a predefined time period. The predefined time period is defined by a Service Level Agreement (SLA). The term used herein, SLA refers to a service contract where a data center of the plurality of data centers 110 may commit to provide a particular service level to a given customer. SLA governs the quality, availability, and support commitments that the provider makes to the consumer. For example, the data retrieved for every 10 minutes from the plurality of data centers 110 is bundled that is governed by a predefined SLA.

The transmitting module 250 transmits each batch of the plurality of batches to the secondary directory 230B. The transmitting module transmits the each batch of the plurality of batches at the end of the predefined time period defined by the SLA. The each batch of the plurality of batches in the second directory 230B is immutable. The content of the each batch of the plurality of batches that is immutable cannot be altered after the creation of each batch.

The delivery module 260 delivers the each batch of the plurality of batches to the batch consumer 130 and the streaming consumer 140. Further, the delivery module 260 delivers the data in the first directory 230A to the streaming consumer. In an embodiment, the data in the first directory 230A and each batch of the plurality of batches in the second directory 230B are delivered to the streaming consumer in parallel for analysis.

FIG. 3 illustrates a flowchart 300 for delivering data to the batch consumer 130 and the streaming consumer 140, in accordance with various embodiments of the present invention. At step 310, the flowchart 300 initiates. At step 320, the data analysis engine 120 retrieves the data from the plurality of data centers 110. The data is retrieved as continuous streams from the plurality of data centers 110.

At step 330, the data analysis engine 120 stores the data in the first directory 230A. At step 340, the data analysis engine 120 bundles the data retrieved as continuous streams into the plurality of batches. The data analysis engine 120 bundles the data as defined by the SLA. The SLA commits to the batch consumer 130 and the streaming consumer 140 to provide the data for the predefined time period. For example, the data analysis engine 120 bundles the data retrieved for every 10 minutes into the plurality of batches.

At step 350, the data analysis engine 120 transfers the plurality of batches to the second directory 230B. Each batch of the plurality of batches in the second directory 230B becomes immutable. At step 360, the data analysis engine 120 delivers the each batch of the plurality of batches to the batch consumer 130. At step 370, the data analysis engine 120 delivers the each batch of the plurality of batches in the second directory 230B and the data in the first directory 230A to the streaming consumer 140. At step 380, the flowchart 300 terminates.

For example, the data analysis engine 120 retrieves data in continuous streams for an interval from 13:00 to 14:00 from the plurality of data centers 110. The data analysis engine 120 stores the data in the first directory 230A. For every 10 minutes (the predefined time period is configurable by the SLA) the data analysis engine 120 bundles the data into the plurality of batches. At the end of first 10 minutes (13:00-13:10) the data analysis engine 120 flushes the batch B1 to the secondary directory 230B. The batch B1 becomes immutable in the secondary directory 230B when the data analysis engine 120 bundles the data for the next 10 minutes time period (13:10-13:20). The data analysis engine 120 delivers the batch B1 in the second directory 230B to the batch consumer 130 and the streaming consumer 140 for further analysis. Further, the data analysis engine 120 delivers the data collected in the first 10 minutes (13:00-13:10) in the first directory 230A to the streaming consumer for analysis.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for providing data to a batch consumer and a streaming consumer, the method comprising:
   performing with a data analysis engine:
   retrieving data from a plurality of data centers, wherein the data is electronically transferred from the plurality of data centers;
   storing the data in a first memory location;
   bundling the data into a plurality of batches in the first memory location, wherein bundling the data is in accordance with a time period;
   transmitting the plurality of batches to a second memory location, wherein each batch of the plurality of batches is immutable;
   delivering each batch of the plurality of batches in the second memory location to the batch consumer; and
   delivering the data in the first memory location and each batch of the plurality of batches in the second memory location to the streaming consumer.

2. The method of claim 1, wherein the time period is a predefined time period is defined by a Service Level Agreement (SLA).

3. The method of claim 1, wherein the delivery of the data in the first memory location to the streaming consumer and each batch of the plurality of batches to the batch consumer and the streaming consumer comprises parallel delivery.

4. The method of claim 1, wherein the first memory location comprises a first directory and the second memory location comprises a second directory.

5. The method of claim 1, wherein the data is electronically transferred comprises the data is continuously streamed from the plurality of data centers.

6. The method of claim 1, wherein the data is electronically transferred comprises the data is transferred via data batch processes from the plurality of data centers over a predefined period of time and the data analysis engine comprises a batch analysis.

7. The method of claim 6, wherein the data analysis engine comprises a batch analysis.

8. The method of claim 1, wherein delivering the data further comprises:
delivering the data in the first memory location and each batch of the plurality of batches in the second memory location to the streaming consumer and a batch consumer.

9. A system for providing data to a batch consumer and a streaming consumer, the system comprising:
a processor; and
a memory, coupled to the processor, including instructions executable by the processor to:
retrieve data from a plurality of data centers;
bundle the data into a plurality of batches in a first memory location in the memory;
transmit each batch of the plurality of batches to a second memory location in the memory; and
deliver the data in the second memory location to the streaming consumer and each batch of the plurality of batches to the batch consumer and the streaming consumer.

10. The system of claim 9, wherein the bundler bundles the data received within a predefined time period in the first directory.

11. The system of claim 9, wherein the instructions are further executable by the processor to transmit the each batch of the plurality of batches to the secondary memory location at the end of the predefined time period.

12. The system of claim 9, wherein the instructions are further executable by the processor to deliver the each batch of the plurality of batches in the second memory location to the batch consumer.

13. The system of claim 9, wherein the instructions are further executable by the processor to deliver the data in the first memory location and the each batch of the plurality of batches in the second memory location to the streaming consumer.

14. The system of claim 9, wherein the first memory location comprises a first directory and the second memory location comprises a second directory.

15. A non-transitory, computer program product comprising instructions stored therein, wherein the instructions are executable by a processor of a data processing system to cause the data processing system to:
retrieve data from a plurality of data centers, wherein the data is electronically transferred from the plurality of data centers;
store the data in a first memory location;
bundle the data into a plurality of batches in the first memory location, wherein bundling the data is in accordance with a time period;
transmit the plurality of batches to a second memory location, wherein each batch of the plurality of batches is immutable;
deliver each batch of the plurality of batches in the second memory location to the batch consumer; and
deliver the data in the first memory location and each batch of the plurality of batches in the second memory location to the streaming consumer.

16. The computer program product of claim 15, wherein the time period is a predefined time period is defined by a Service Level Agreement (SLA).

17. The computer program product of claim 15, wherein the delivery of the data in the first memory location to the streaming consumer and each batch of the plurality of batches to the batch consumer and the streaming consumer comprises parallel delivery.

18. The computer program product of claim 15, wherein the first memory location comprises a first directory and the second memory location comprises a second directory.

19. The computer program product of claim 15, wherein the data is electronically transferred comprises the data is continuously streamed from the plurality of data centers.

20. The computer program product of claim 15, wherein to deliver the data further comprises to:
deliver the data in the first memory location and each batch of the plurality of batches in the second memory location to the streaming consumer and a batch consumer.

* * * * *